US010315763B2

(12) United States Patent
Anand et al.

(10) Patent No.: US 10,315,763 B2
(45) Date of Patent: Jun. 11, 2019

(54) MANAGING PACKAGE DELIVERIES BY ROBOTIC VEHICLES

(71) Applicant: QUALCOMM Incorporated, San Diego, CA (US)

(72) Inventors: Shankar Anand, Hyderabad (IN); Ashutosh Gupta, Hyderabad (IN); Ankit Banaudha, Hyderabad (IN); Amandeep Singh Bedi, Hyderabad (IN); Michael Franco Taveira, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/685,168

(22) Filed: Aug. 24, 2017

(65) Prior Publication Data
US 2019/0061939 A1    Feb. 28, 2019

(51) Int. Cl.
*B64C 39/02* (2006.01)
*G06Q 10/08* (2012.01)
(Continued)

(52) U.S. Cl.
CPC ......... *B64C 39/024* (2013.01); *G05D 1/0088* (2013.01); *G06Q 10/0835* (2013.01);
(Continued)

(58) Field of Classification Search
CPC ... B64C 39/0245; B64C 39/024; B64C 39/02; G08G 5/0069; G08G 5/0013; G06Q 10/083; G06Q 10/08; G06Q 30/0607; G07B 17/00435; H04B 1/38; G06F 19/00; G06K 9/00

See application file for complete search history.

(56) References Cited

U.S. PATENT DOCUMENTS 8,600,905 B1 *  12/2013  Paletz .............. G07B 17/00435
                                                            705/330
8,774,867 B2 *  7/2014   Oono .................... H04M 1/576
                                                            382/115
(Continued)

FOREIGN PATENT DOCUMENTS

NL      2010616 C    *  9/2014  ......... G06Q 30/0607
WO      2017115446 A1    7/2017
WO      WO-2018036040 A1 *  3/2018  ............... G06K 9/00

OTHER PUBLICATIONS

International Search Report and Written Opinion—PCT/US2018/044749—ISA/EPO—dated Nov. 7, 2018, 14 pages.

*Primary Examiner* — Yuri Kan
(74) *Attorney, Agent, or Firm* — The Marbury Law Group, PLLC

(57) ABSTRACT

Various methods for performing package deliveries by a robotic vehicle may include determining whether an individual at a package delivery location is a requester or an authorized recipient of a package to be delivered by the robotic vehicle at the package delivery location, sending a notification to the requester of the package in response to determining that the individual at the package delivery location is not the requester or an authorized recipient, and delivering the package to the individual at the package delivery location in response to receiving authorization from the requester to deliver the package to the individual.

30 Claims, 8 Drawing Sheets

(51) Int. Cl.
*G08G 5/00* (2006.01)
*G05D 1/00* (2006.01)
*H04W 12/06* (2009.01)

(52) U.S. Cl.
CPC .......... *G08G 5/0069* (2013.01); *H04W 12/06* (2013.01); *B64C 2201/128* (2013.01)

(56) References Cited

U.S. PATENT DOCUMENTS

| | | | |
|---|---|---|---|
| 9,646,283 B2 * | 5/2017 | Kantor | G08G 5/0013 |
| 2004/0243280 A1 * | 12/2004 | Bash | G05D 1/0246 |
| | | | 700/245 |
| 2016/0068264 A1 * | 3/2016 | Ganesh | G08G 5/0069 |
| | | | 701/2 |
| 2016/0189101 A1 | 6/2016 | Kantor et al. | |
| 2016/0239798 A1 | 8/2016 | Borley et al. | |
| 2016/0371648 A1 * | 12/2016 | Scipioni | G06Q 10/083 |
| 2017/0011333 A1 | 1/2017 | Greiner et al. | |
| 2017/0174343 A1 | 6/2017 | Erickson et al. | |

\* cited by examiner

MANAGING PACKAGE DELIVERIES BY ROBOTIC VEHICLES

BACKGROUND

A robotic vehicle, such as an unmanned autonomous vehicle (UAV) or drone, may be utilized to deliver packages or products to a person at a package delivery location. In a typical approach, the robotic vehicle may authenticate the recipient of the package after the robotic vehicle has arrived. If the robotic vehicle is able to authenticate the recipient, the delivery is made. However, if the authorized recipient is unavailable, the robotic vehicle may not be able to make the delivery or risk an unauthorized individual taking the package.

SUMMARY

Various embodiments include methods of secured authentication for robotic vehicle performing package delivery. Various embodiments may include a robotic vehicle determining whether an individual at a package delivery location is a requester or an authorized recipient of a package to be delivered by the robotic vehicle at the package delivery location, sending a notification to the requester of the package in response to determining that the individual at the package delivery location is not the requester or an authorized recipient, and delivering the package to the individual at the package delivery location in response to receiving authorization from the requester to deliver the package to the individual.

In some embodiments, determining whether an individual at a package delivery location is a requester or authorized recipient of a package may include capturing one or more images at the package delivery location and determining whether any individual in the one or more images captured at the package delivery location matches a previously provided image of the requester or an authorized recipient. In some embodiments, sending a notification to the requester of the package may include sending at least one of the one or more images captured at the package delivery location to the requester.

In some embodiments, determining whether any individual in the one or more images captured at the package delivery location matches a previously provided image of the requester or an authorized recipient may include performing facial recognition processing of at least one of the one or more images captured at the package delivery location.

In some embodiments, determining whether any individual in the one or more images captured at the package delivery location matches a previously provided image of the requester or an authorized recipient may include sending the one or more images captured at the package delivery location to a server and receiving, from the server, results of image processing performed by the server on at least one of the one or more images captured at the package delivery location.

In some embodiments, determining whether any individual in the one or more images captured at the package delivery location matches a previously provided image of the requester or an authorized recipient may include performing facial recognition processing on at least one of the one or more images captured at the package delivery location to obtain facial features of an individual and determining whether the obtained facial features match facial features obtained from the previously provided image of the requester or an authorized recipient within a threshold value of similarity.

In some embodiments, determining whether any individual in the one or more images captured at the package delivery location matches a previously provided image of the requester or an authorized recipient may include performing, by a processor of the robotic vehicle, facial recognition processing on at least one of the one or more images captured at the package delivery location by the robotic vehicle.

In some embodiments, the previously provided image of the requester or an authorized recipient was previously provided by the requester. Some embodiments may further include delivering the package to the individual in response to determining that the individual at the package delivery location is either the requester or an authorized recipient and determining that a validity duration for the previously provided image has not expired.

In some embodiments, the previously provided image of the requester or an authorized recipient was previously captured by a robotic vehicle performing package delivery. Some embodiments may further include delivering the package to the individual in response to determining that the individual at the package delivery location is either the requester or an authorized recipient and determining that a location associated with the previously provided image matches the package delivery location.

Some embodiments may further include receiving, from the requester, an alternate package delivery location in response to the notification and proceeding to the alternate package delivery location to attempt the package delivery. Some embodiments may further include returning the package to an origination location in response to receiving, from the requester, an indication that the package should not be delivered to the individual. Some embodiments may further include returning the package to an origination location in response to not receiving a response from the requester to the notification within a pre-determined amount of time.

Further embodiments include a robotic vehicle including a processor configured with processor-executable instructions to perform operations of the methods summarized above. Further embodiments include a non-transitory processor-readable storage medium having stored thereon processor-executable software instructions configured to cause a processor of a robotic vehicle to perform operations of the methods summarized above. Further embodiments include a robotic vehicle that includes means for performing functions of the operations of the methods summarized above.

BRIEF DESCRIPTION OF THE DRAWINGS

The accompanying drawings, which are incorporated herein and constitute part of this specification, illustrate exemplary embodiments of the claims, and together with the general description and the detailed description given herein, serve to explain the features of the claims.

DETAILED DESCRIPTION

Figure 1:
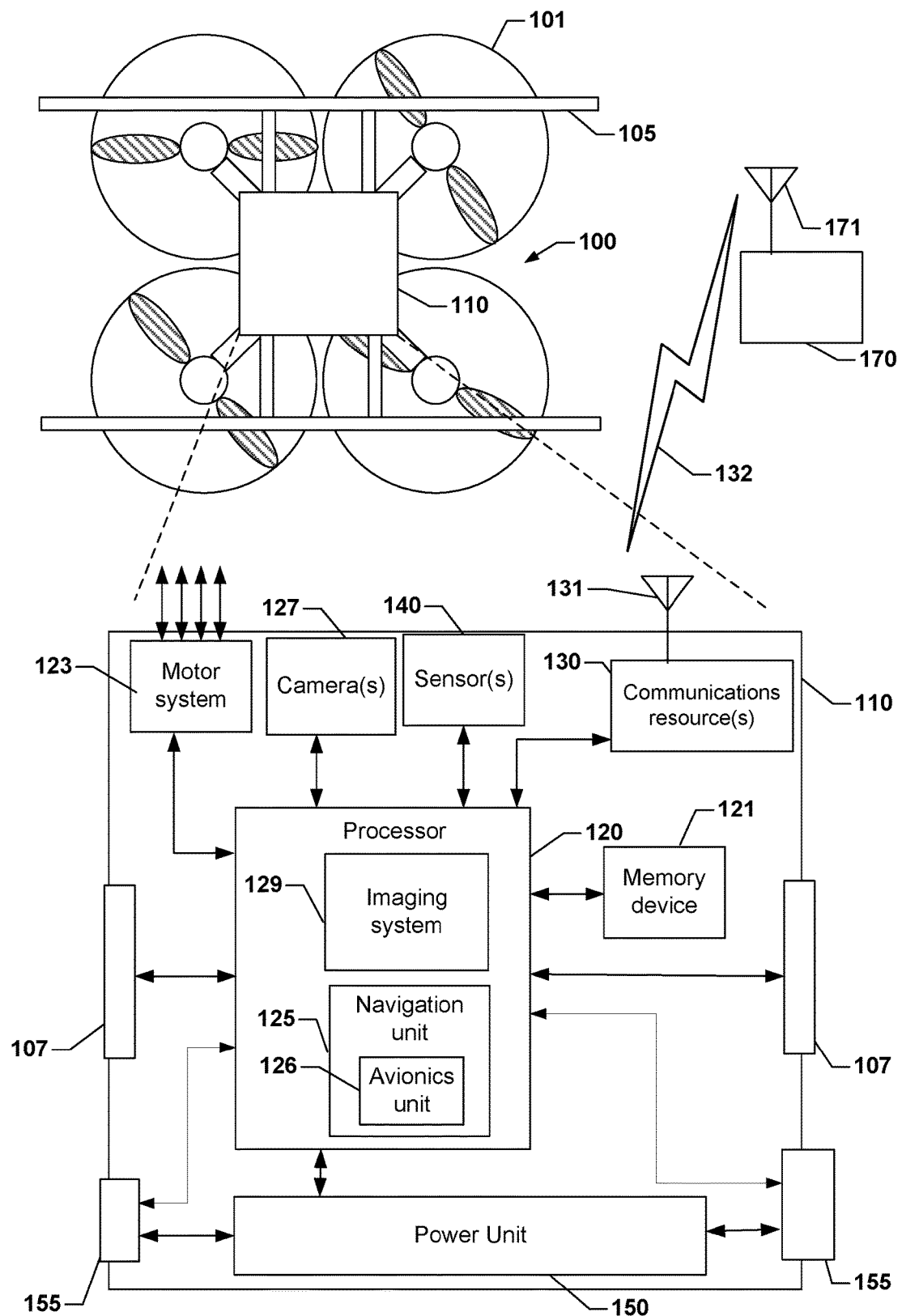
FIG. 1 is a block diagram illustrating components of a robotic vehicle, such as an aerial unmanned autonomous vehicle (UAV) suitable for use in various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Robotic vehicles, such as drones or autonomous motor vehicles, can be used to delivery packages, such as packages including a product or products purchased or ordered by an individual. Robotic vehicles for delivery may carry a package as a payload, and include communications and sensors (e.g., cameras) for identifying for a person or persons authorized to receive the package upon arriving at a package delivery location. Such autonomous delivery methods may provide convenience and improved efficiencies under many circumstances. However, if no one authorized to receive the package is present when the robotic vehicle arrives at the package delivery location, the robotic vehicle may not be able to complete a package delivery, requiring the robotic vehicle to return to base with the package.

Various embodiments include methods for completing a package delivery by a robotic vehicle when the requester or a predetermined authorized recipient is not present when the robotic vehicle arrives at the package delivery location. For ease of reference, the person ordering, purchasing or otherwise requesting delivery of product(s) or package(s) to be delivered by the robotic vehicle (and thus the person with knowledge of the package and interest in secure delivery) is referred to as the "requester." However, this term is not intended to be limiting, and the term "requester" encompasses any person empowered to authorize or redirect deliveries of the items being delivered by the robotic vehicle.

A requester may place an order for a package to be delivered by a robotic vehicle to another person identified by the requester at a delivery location. For ease of reference, a person identified by the requester as authorized to receive delivery of the package is referred to herein as a "predetermined authorized recipient." In various embodiments, a predetermined authorized recipient is a recipient for the package who is authorized (e.g., by the requester) to receive the package from the drone anytime that the drone would otherwise contact the requester for authorization to delivery/release the package.

The requester may designate someone as a predetermined authorized recipient at any time, such as (but not limited to) when the robotic vehicle reaches the delivery location, before the robotic vehicle reaches the delivery location, before the robotic vehicle departs for the delivery location, when the requester purchases or otherwise requests delivery of the item(s) within the package, and before the requester purchases or otherwise requests delivery of the item(s) within the package, such as by designating someone as a regular, default or alternate recipient for receiving future deliveries. In some embodiments, the requester may identify a person as a predetermined authorized recipient by providing one or more images of the person to a service or operator of delivery robotic vehicles.

In various embodiments, if a robotic vehicle determines that the requester or a predetermined authorized recipient is not present at the package delivery location, the robotic vehicle may send a notification regarding the situation to the requester and request instructions from the requester regarding package delivery. If the robotic vehicle receives a response from the requester indicating that the package should be delivered anyway, the robotic vehicle may do so. If the robotic vehicle receives a response from the requester identifying an alternate delivery location, the robotic vehicle may proceed to that location and again determine whether the requester or predetermined authorized recipient is present. The various embodiments thus enable a delivery robotic vehicle to complete a package delivery when the requester or predetermined authorized recipient is not present at the initial package delivery location. This may save time and money for package deliveries performed by robotic vehicles.

In some embodiments, the authorization of a person as a predetermined authorized recipient may come from someone associated with the requester (for example, such an "associated person" may be a family member or other person associated with the requester's account). This associated person may or may not be a predetermined authorized recipient. In such embodiments, the request to deliver the package may go to the requester and/or the associated person to allow the requester and/or the associated person to provide authorization for a predetermined authorized recipient. Likewise, the associated person may or may not be present at the delivery location. However, if the associated person is present at the delivery location, he/she may authorize themselves to receive the package in response to the request.

In some embodiments, the robotic vehicle may use facial recognition processes (performed by a robotic vehicle processor or a remote server) to determine whether the requester or predetermined authorized recipient is present. If the requester or predetermined authorized recipient are not present at the package delivery location, the notification sent to the requester may include an image of an individual prepared to receive the package at the package delivery location. This may enable the requester to view the individual prepared to receive the package (e.g., on a smart phone app). In such embodiments, if the requester responds by authorizing delivery of the package to the individual, the image of that individual may be saved in memory (e.g., in memory of the robotic vehicle and/or memory of a server)

for use in subsequent package delivery situations for recognizing whether a predetermined authorized recipient is at the package delivery location.

As used herein, the term "robotic vehicle" refers to one of various types of vehicles including an onboard computing device configured to provide some autonomous or semi-autonomous capabilities. Examples of robotic vehicles include but are not limited to: aerial vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors.

In various embodiments, when a robotic vehicle arrives at an intended package delivery location, the robotic vehicle may determine whether the requester or predetermined authorized recipient for the package is at the package delivery location. The robotic vehicle may use any of a number of sensors or mechanisms for determining whether the requester or predetermined authorized recipient for a package is present at the package delivery location. In some embodiments, the robotic vehicle may use an onboard camera to capture one or more images of the package delivery location and use face recognition processing to determine whether there is an individual within the captured images. In some embodiments, the robotic vehicle may attain one or more further images of the face of any individual determined to be present at the package delivery location. In some embodiments, the robotic vehicle may send one or more images captured at the delivery location to a server for image processing and receive results of image processing from the server. If an individual is determined to be present in images of the delivery location, a processor on the robotic vehicle (or a remote server) may use facial recognition processing of the captured images to obtain facial features that may be compared to facial features in stored images of the requester and/or authorized recipients to determine whether the individual detected at the delivery location is the requester or an authorized recipient.

In some embodiments, the robotic vehicle may determine whether the detected individual (or any detected individuals) is the requester or predetermined authorized recipient by comparing the one or more captured images to a previously provided image of the requester or an authorized recipient. For example, the requester may have previously uploaded or otherwise provided a digital image of the requester or predetermined authorized recipient. Alternatively, an image of the requester or the recipient may have been captured by a robotic vehicle during a previous package delivery. In some embodiments, facial recognition processing may be used to determine whether the detected individual is the requester or predetermined authorized recipient. For example, the robotic vehicle may perform facial recognition processing on the one or more captured images and/or the previously provided image to determine whether facial features of the detected individual match facial features within the stored images of the requester and/or authorized recipient(s) within a threshold value or level of similarity. Alternatively, the robotic vehicle may send the one or more captured images at the package delivery location (e.g., image(s) of the location or image(s) of an individual or individuals) at that location to a server for facial recognition processing and comparison to images of the requester and/or authorized recipients stored at the server, and receive results of such facial recognition processing from the server.

If the detected individual is determined to be the requester or an authorized recipient, the robotic vehicle may deliver the package. However, if the detected individual is not the requester, the robotic vehicle may send a notification message to the requester. In some embodiments, the notification may include one or more captured images of the individual present at the package delivery location. For example, the captured image or images may be transmitted in a format that enables the image to be presented on a smart phone app of the requester. In addition to presenting a picture of the individual, such an app on the requester's smart phone may include, but is not limited to, information about the package being delivered, the package delivery location, a prompt asking the requester to confirm delivery of the package to the identified individual, and displayed virtual keys enabling the requester to quickly confirm or deny package delivery. The requester may review the notification (e.g., examine the image to determine whether the requester recognizes the detected individual) and respond to the notification, such as by pressing an appropriate virtual key. Based on the requester's input, the smart phone app may transmit a notification response to the robotic vehicle directly or via a server. The notification response, for example, may indicate that the detected individual is authorized to receive the package. Alternatively, the notification response may indicate that the detected individual is not an authorized recipient. In still another option, the notification response may indicate another time or an alternate delivery location at which the robotic vehicle should attempt delivery.

If the robotic vehicle receives a notification response from the requester indicating that the detected individual at the package delivery location is authorized to receive the package, the robotic vehicle may deliver the package to or near the individual and return to base. In some embodiments, the robotic vehicle may store the image or images of the individual (i.e., the image(s) that were presented to the requester) in memory for use in recognizing authorized recipients during subsequent package deliveries.

In some embodiments, the robotic vehicle may wait a predetermined amount of time for the notification response. If the notification response is not received within the predetermined amount of time, the robotic vehicle may return to the robotic vehicle's point of origin, a holding location, a charging location, or some other location. In some embodiments, the robotic vehicle may also wait for new instructions. If the robotic vehicle receives a notification response indicating that the detected individual is not an authorized recipient, the robotic vehicle may return to the robotic vehicle's point of origin, base, or other location without delivering the package or wait for new instructions. If the notification response indicates that the detected individual is not an authorized recipient but includes an alternate delivery location, the robotic vehicle may proceed to the alternate delivery location and attempt to deliver the package at that location (e.g., look for the requestor or a predetermined authorized recipient at an alternate location). In some cases, the robotic vehicle may again perform operations of determining whether an individual at the alternate delivery location is the requester or an authorized recipient, and proceed as summarized above.

The terms Global Positioning System (GPS) and Global Navigation Satellite System (GNSS) are used interchangeably herein to refer to any of a variety of satellite-aided navigation systems, such as GPS deployed by the United States, GLObal NAvigation Satellite System (GLONASS) used by the Russian military, and Galileo for civilian use in the European Union, as well as terrestrial communication systems that augment satellite-based navigation signals or provide independent navigation information.

FIG. 1 illustrates an example aerial robotic vehicle 100 suitable for use with various embodiments. The example robotic vehicle 100 is a "quad copter" having four horizontally configured rotary lift propellers, or rotors 101 and motors fixed to a frame 105. The frame 105 may support a control unit 110, landing skids and the propulsion motors, power source (power unit 150) (e.g., battery), payload securing mechanism (payload securing unit 107), and other components. Land-based and waterborne robotic vehicles may include compliments similar to those illustrated in FIG. 1.

The robotic vehicle 100 may be provided with a control unit 110. The control unit 110 may include a processor 120, communication resource(s) 130, sensor(s) 140, and a power unit 150. The processor 120 may be coupled to a memory unit 121 and a navigation unit 125. The processor 120 may be configured with processor-executable instructions to control flight and other operations of the robotic vehicle 100, including operations of various embodiments. In some embodiments, the processor 120 may be coupled to a payload securing unit 107 and landing unit 155. The processor 120 may be powered from the power unit 150, such as a battery. The processor 120 may be configured with processor-executable instructions to control the charging of the power unit 150, such as by executing a charging control algorithm using a charge control circuit. Alternatively or additionally, the power unit 150 may be configured to manage charging. The processor 120 may be coupled to a motor system 123 that is configured to manage the motors that drive the rotors 101. The motor system 123 may include one or more propeller drivers. Each of the propeller drivers includes a motor, a motor shaft, and a propeller.

Through control of the individual motors of the rotors 101, the robotic vehicle 100 may be controlled in flight. In the processor 120, a navigation unit 125 may collect data and determine the present position and orientation of the robotic vehicle 100, the appropriate course towards a destination, and/or the best way to perform a particular function.

An avionics component 126 of the navigation unit 125 may be configured to provide flight control-related information, such as altitude, attitude, airspeed, heading and similar information that may be used for navigation purposes. The avionics component 126 may also provide data regarding the orientation and accelerations of the robotic vehicle 100 that may be used in navigation calculations. In some embodiments, the information generated by the navigation unit 125, including the avionics component 126, depends on the capabilities and types of sensor(s) 140 on the robotic vehicle 100.

The control unit 110 may include at least one sensor 140 coupled to the processor 120, which can supply data to the navigation unit 125 and/or the avionics component 126. For example, the sensor(s) 140 may include inertial sensors, such as one or more accelerometers (providing motion sensing readings), one or more gyroscopes (providing rotation sensing readings), one or more magnetometers (providing direction sensing), or any combination thereof. The sensor(s) 140 may also include GPS receivers, barometers, thermometers, audio sensors, motion sensors, etc. Inertial sensors may provide navigational information, e.g., via dead reckoning, including at least one of the position, orientation, and velocity (e.g., direction and speed of movement) of the robotic vehicle 100. A barometer may provide ambient pressure readings used to approximate elevation level (e.g., absolute elevation level) of the robotic vehicle 100.

In some embodiments, the communication resource(s) 130 may include a GPS receiver, enabling GNSS signals to be provided to the navigation unit 125. A GPS or GNSS receiver may provide three-dimensional coordinate information to the robotic vehicle 100 by processing signals received from three or more GPS or GNSS satellites. GPS and GNSS receivers can provide the robotic vehicle 100 with an accurate position in terms of latitude, longitude, and altitude, and by monitoring changes in position over time, the navigation unit 125 can determine direction of travel and speed over the ground as well as a rate of change in altitude. In some embodiments, the navigation unit 125 may use an additional or alternate source of positioning signals other than GNSS or GPS. For example, the navigation unit 125 or one or more communication resource(s) 130 may include one or more radio receivers configured to receive navigation beacons or other signals from radio nodes, such as navigation beacons (e.g., very high frequency (VHF) omnidirectional range (VOR) beacons), Wi-Fi access points, cellular network sites, radio stations, etc. In some embodiments, the navigation unit 125 of the processor 120 may be configured to receive information suitable for determining position from the communication resources(s) 130.

In some embodiments, the robotic vehicle 100 may use an alternate source of positioning signals (i.e., other than GNSS, GPS, etc.). Because robotic vehicles often fly at low altitudes (e.g., below 400 feet), the robotic vehicle 100 may scan for local radio signals (e.g., Wi-Fi signals, Bluetooth signals, cellular signals, etc.) associated with transmitters (e.g., beacons, Wi-Fi access points, Bluetooth beacons, small cells (picocells, femtocells, etc.), etc.) having known locations, such as beacons or other signal sources within restricted or unrestricted areas near the flight path. The navigation unit 125 may use location information associated with the source of the alternate signals together with additional information (e.g., dead reckoning in combination with last trusted GNSS/GPS location, dead reckoning in combination with a position of the robotic vehicle takeoff zone, etc.) for positioning and navigation in some applications. Thus, the robotic vehicle 100 may navigate using a combination of navigation techniques, including dead-reckoning, camera-based recognition of the land features below and around the robotic vehicle 100 (e.g., recognizing a road, landmarks, highway signage, etc.), etc. that may be used instead of or in combination with GNSS/GPS location determination and triangulation or trilateration based on known locations of detected wireless access points.

In some embodiments, the control unit 110 may include a camera 127 and an imaging system 129. The imaging system 129 may be implemented as part of the processor 120, or may be implemented as a separate processor, such as an application specific integrated circuit (ASIC), a field programmable gate array (FPGA), or other logical circuitry. For example, the imaging system 129 may be implemented as a set of executable instructions stored in the memory unit 121 that execute on the processor 120 coupled to the camera 127. The camera 127 may include sub-components other than image or video capturing sensors, including auto-focusing circuitry, International Organization for Standardization (ISO) adjustment circuitry, and shutter speed adjustment circuitry, etc.

The control unit 110 may include one or more communication resources 130, which may be coupled to at least one transmit/receive antenna 131 and include one or more transceivers. The transceiver(s) may include any of modulators, de-modulators, encoders, decoders, encryption modules, decryption modules, amplifiers, and filters. The communication resource(s) 130 may be capable of device-to-device and/or cellular communication with other robotic vehicles, wireless communication devices carried by a user (e.g., a smartphone), a robotic vehicle controller, and other devices or electronic systems (e.g., a vehicle electronic system).

The processor 120 and/or the navigation unit 125 may be configured to communicate through the communication resource(s) 130 with a wireless communication device 170 through a wireless connection (e.g., a cellular data network) to receive assistance data from the server and to provide robotic vehicle position information and/or other information to the server.

A bi-directional wireless communication link 132 may be established between transmit/receive antenna 131 of the communication resource(s) 130 and the transmit/receive antenna 171 of the wireless communication device 170. In some embodiments, the wireless communication device 170 and robotic vehicle 100 may communicate through an intermediate communication link, such as one or more wireless network nodes or other communication devices. For example, the wireless communication device 170 may be connected to the communication resource(s) 130 of the robotic vehicle 100 through a cellular network base station or cell tower. Additionally, the wireless communication device 170 may communicate with the communication resource(s) 130 of the robotic vehicle 100 through a local wireless access node (e.g., a WiFi access point) or through a data connection established in a cellular network.

In some embodiments, the communication resource(s) 130 may be configured to switch between a cellular connection and a Wi-Fi connection depending on the position and altitude of the robotic vehicle 100. For example, while in flight at an altitude designated for robotic vehicle traffic, the communication resource(s) 130 may communicate with a cellular infrastructure in order to maintain communications with the wireless communication device 170. For example, the robotic vehicle 100 may be configured to fly at an altitude of about 400 feet or less above the ground, such as may be designated by a government authority (e.g., FAA) for robotic vehicle flight traffic. At this altitude, it may be difficult to establish communication links with the wireless communication device 170 using short-range radio communication links (e.g., Wi-Fi). Therefore, communications with the wireless communication device 170 may be established using cellular telephone networks while the robotic vehicle 100 is at flight altitude. Communications with the wireless communication device 170 may transition to a short-range communication link (e.g., Wi-Fi or Bluetooth) when the robotic vehicle 100 moves closer to a wireless access point.

While the various components of the control unit 110 are illustrated in FIG. 1 as separate components, some or all of the components (e.g., the processor 120, the motor system 123, the communication resource(s) 130, and other units) may be integrated together in a single device or unit, such as a system-on-chip. The robotic vehicle 100 and the control unit 110 may also include other components not illustrated in FIG. 1.

Various embodiments include a robotic vehicle configured to carry a product or package to a package delivery location, determine whether there are any individuals at the package delivery location, determine whether a present individual is a requester or authorized recipient of the package to be delivered at the package delivery location, and send a notification to the requester of the package in response to determining that no detected individual is the requester or an authorized recipient. The robotic vehicle may deliver the package to the detected individual in response to receiving an indication from the requester that the package should be delivered to the detected individual, or return to base or attempted delivery at an alternate delivery location in response to receiving an indication from the requester that the package should not be delivered to the detected individual.

Figure 2:
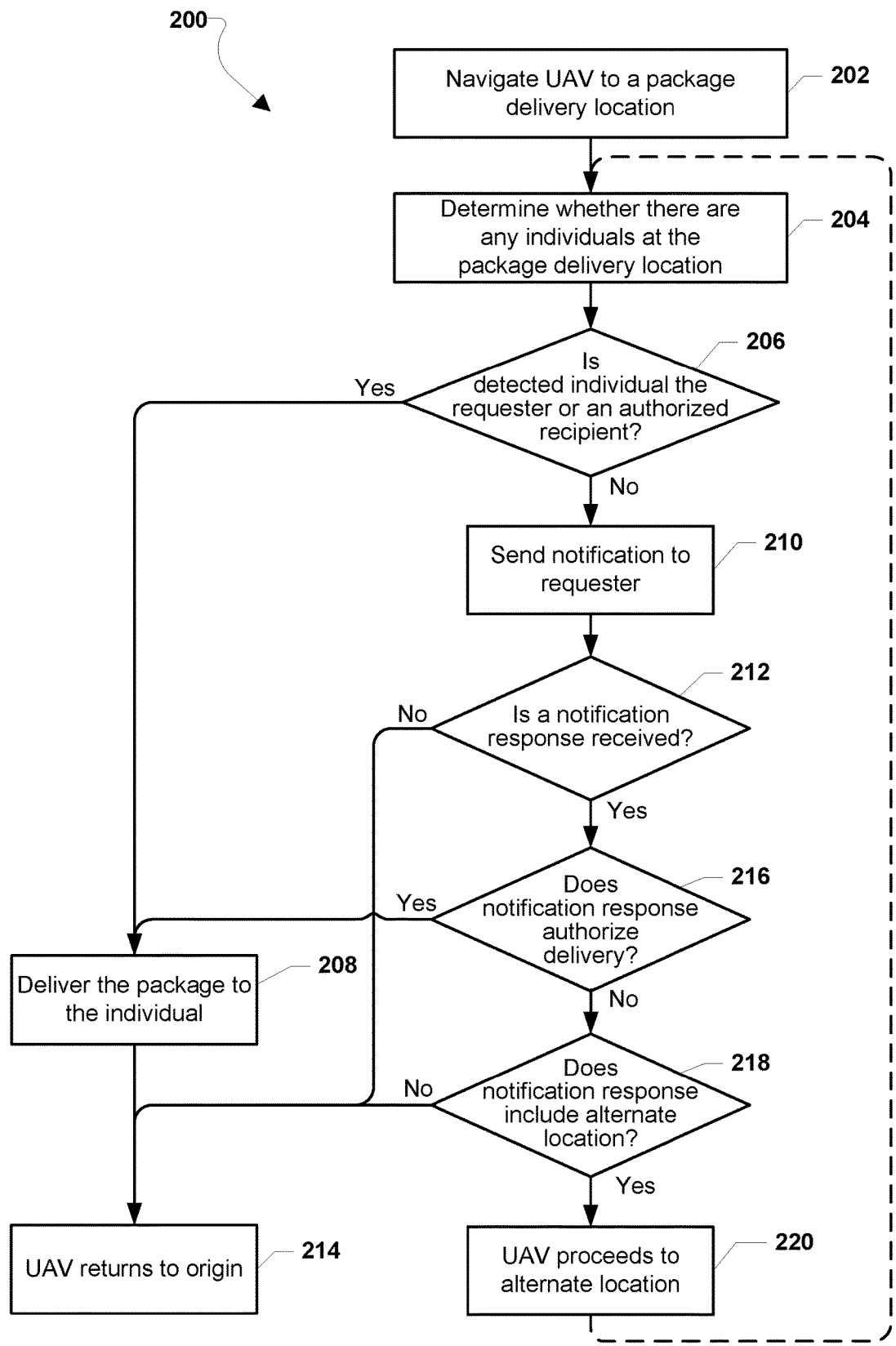
FIG. 2 is a process flow diagram illustrating a method of managing package delivery by a robotic vehicle, such as a UAV, according to various embodiments.

FIG. 2 illustrates a method 200 for performing package delivery by a delivery robotic vehicle according to various embodiments. With reference to FIGS. 1-2, the operations of the method 200 may be performed by one or more processors (e.g., the processor 120) of a robotic vehicle (e.g., 100). The robotic vehicle may have sensors (e.g., 140), cameras (e.g., 127), and communication resources (e.g., 130), that may be used for detecting and identifying individuals, and the processor may be configured with image processing algorithms for determining whether an individual at a package delivery location is a requester or authorized recipient of a package or product to be delivered.

In block 202, the robotic vehicle may navigate to a package delivery location. For example, the processor(s) of the robotic vehicle may use a variety of navigational techniques to maneuver (e.g., fly or drive) from a base or point of origin to the package delivery location.

In block 204, the robotic vehicle may determine whether there are any individuals at the package delivery location. For example, in some embodiments the processor(s) of the robotic vehicle may operate the camera of the robotic vehicle to capture one or more images of the package delivery location, and use object or facial recognition algorithms to detect whether a person or persons are present in the image(s). Other methods for detecting individuals at the package delivery location may also or alternatively be used (e.g., detecting wireless ID badges, thermal sensors, detecting wireless transmissions from cellular telephones, etc.).

In determination block 206, the processor(s) may determine whether an individual at the package delivery location is the requester or an authorized recipient of the package to be delivered. Any of a variety of methods may be used for this determination. In some embodiments, the processor(s) may use image processing techniques to compare one or more images of the individual or the package delivery location to a previously provided image of the requester or an authorized recipient. In some embodiments, such comparisons may include facial recognition processing with the determination based on whether facial features in the captured and previously provided images match within a threshold value or level of similarity. Alternatively, the processor(s) may send the one or more images captured at the package delivery location to a server for image processing and comparison, and receive results of facial recognition processing from the server.

In response to determining that the detected individual at the package delivery location is the requester or predetermined authorized recipient of the package to be delivered (i.e., determination block 206="Yes"), the processor(s) may control the robotic vehicle to deliver the package in block 208. This may involve releasing the package payload using a variety of delivery mechanisms. Upon delivering the package, the robotic vehicle may return to base or the point of origin in block 214.

In response to determining that no individual at the package delivery location is the requester or predetermined authorized recipient of the package to be delivered (i.e., determination block 206="No"), the processor(s) may send a notification to the requester in block 210. In some embodiments, the processor(s) may send a notification message to a mobile device (e.g., a smartphone) of the requester using any of a variety of wireless communication techniques, such as simple message service (SMS), multimedia message service (MMS), and/or email delivered via a cellular data communication network. In some embodiments, the processor(s) may prompt or otherwise trigger the notification to be sent by a remote server to the mobile device (e.g., a smartphone) of the requester, which the server may accomplish using a variety of wireless communication techniques.

In some embodiments, the processor(s) may send a notification to the requester in block 210 in response to determining that there are no individuals at the package delivery location. In such embodiments and situations, the notification may inform the requester that nobody is there to receive the package and request instructions.

In determination block 212, the processor(s) may determine whether a notification response is received. In some embodiments, the processor(s) may wait a pre-determined amount of time (e.g., 5 minutes, 30 minutes, an hour) to receive a notification response.

In response to determining that a notification response is not received within the predetermined amount of time (i.e., determination block 212="No"), the processor(s) may control the robotic vehicle to return to the robotic vehicle's point of origin or base or perform some other action other than delivering the package in block 214.

In response to determining that a notification response is received (i.e., determination block 212="Yes"), the processor(s) may determine whether the notification response authorizes package delivery in determination block 216. The requester may receive the notification and determine that the individual at the package delivery location is an authorized recipient, in which case the requester would respond to the notification with an indication that the package should be delivered to the individual at the location. The requester may determine that the individual at the package delivery location is not an authorized recipient, in which case the requester would respond to the notification with an indication that the package should not be delivered to the individual at the location.

In response to determining that the notification response authorizes delivery (i.e., determination block 216="Yes"), the processor(s) may control the robotic vehicle to deliver the package in block 208. This may involve the robotic vehicle releasing or otherwise providing the package to the individual by various mechanisms. In embodiments and situations in which the notification informed the requester that nobody was at the package delivery location, the notification response received from the requester may authorize leaving the package at the location anyway. After delivering the package, the robotic vehicle may return to the point of origin or another base or perform some other action other than delivering the package in block 214.

In response to determining that the notification response does not authorize delivery (i.e., determination block 216="No"), the processor(s) may determine whether the notification response includes instructions for delivering the product to an alternate location in determination block 218. For example, although the requester may be unavailable at the package delivery location, the requester or an authorized recipient may be available at an alternate location. In this situation, the requester may indicate the alternate location as part of the notification response. Such a response may indicate whether the package should be delivered to an individual at the alternate delivery location, or whether the package should be simply left at that location. For example, the requester may designate a secure location (e.g., the requester's fenced in backyard) at which the package should be left without regard to whether a particular individual is at that location.

In response to determining that the notification response includes an alternate delivery location (i.e., determination block 218="Yes"), the processor(s) may control the robotic vehicle to proceed to the alternate location in block 220. If the notification response indicates that delivery of the package should be made at a secure location without regard to whether a particular individual is present, the robotic vehicle may deliver the package to that location in block 220 and then return to the point of origin or another base in block 214. If the notification response indicates that delivery of the package should be made to an individual (i.e., the requester or an authorized recipient) at the alternate location, the processor(s) may detect an individual upon arrival at the alternate location in block 204 and repeat operations of the method 200 as described.

In response to determining that the notification response does not include an alternate location (i.e., determination block 218="No"), the processor(s) may control the robotic vehicle to return to the robotic vehicle's point of origin or another base or perform some other action other than delivering the package in block 214.

Figure 3A:
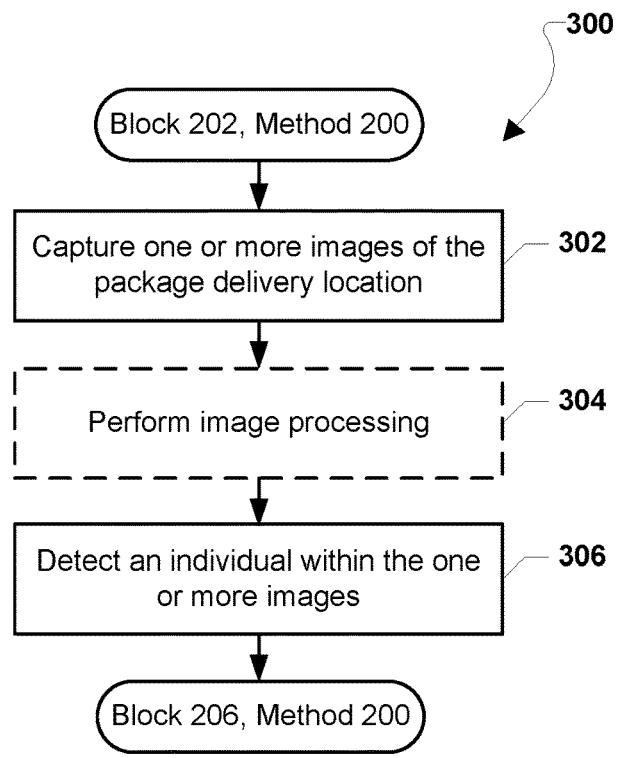
FIG. 3A is a process flow diagram illustrating a method for detecting an individual at a package delivery location according to various embodiments.
Figure 3B:
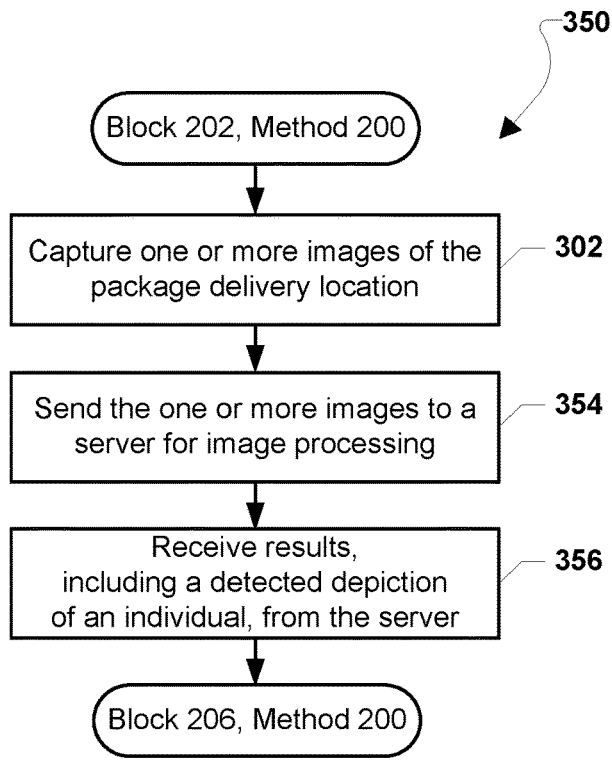
FIG. 3B is a process flow diagram illustrating an alternate method for detecting an individual at a package delivery location according to various embodiments.

FIGS. 3A-3B illustrate methods 300 and 350 for detecting an individual at a package delivery location according to some embodiments. With reference to FIGS. 1-3B, the methods 300 and 350 provide examples of operations that may be performed in block 204 of the method 200. The operations of the methods 300 and 350 may be performed by one or more processors (e.g., the processor 120) of a robotic vehicle (e.g., the robotic vehicle 100). The method 300 is for detecting an individual at a package delivery location in which operations of detecting an individual within images of the package delivery location are performed by the processor(s) and/or other elements of the robotic vehicle. The method 350 is for detecting an individual at a package delivery location in which operations of detecting an individual within images of the package delivery location are performed by a server.

Referring to the method 300, following arrival at the package delivery location in block 202, the processor(s) may capture one or more images of the package delivery location in block 302. For example, the processor(s) may control a camera (e.g., 127) or video camera of the robotic vehicle to capture one or more images (e.g., a video clip) at the package delivery location.

In optional block 304, image processing may be performed on the one or more captured images to enhance the images or recognize forms within the images. In some embodiments, image processing may be performed by the processor(s) and/or other components on the robotic vehicle. In some embodiments, the one or more images may be sent to a server for image processing, and image processing results may be received from the server. In some embodiments, the processor(s) and/or other elements of the robotic vehicle may perform some image processing while other image processing may be performed by a server.

In block 306, the processor(s) may detect any individuals within the one or more images. The processor(s) may perform shape recognition algorithms to distinguish human forms within the one or more images, or face recognition out. Such image processing may include analyzing detected human forms to determine whether detected individuals are readily identifiable. For example, the image processing may determine whether individuals' faces are sufficient visible in any image to enable facial recognition processing. The processor(s) may then proceed with the operations of determination block 206 of the method 200 as described.

Referring to the method 350, following arrival at the package delivery location in block 202, the processor(s) may capture one or more images of the package delivery location in block 302. For example, the processor(s) may control a camera (e.g., 127) or video camera of the robotic vehicle to capture one or more images at the package delivery location.

In block 354, the processor(s) may send the one or more captured images to a server for image processing. Image processing performed by the server may include analyzing the one or more images to detect individuals within the one or more images received from the robotic vehicle and determine whether a detected individual is readily identifiable. For example, the image processing may determine whether individuals' faces are sufficient visible in any image to enable facial recognition processing.

In block 356, the processor(s) of the robotic vehicle may receive results of the image processing from the server. For example, the received results may include facial features of an individual within one or more images of the package delivery location. The processor(s) may then proceed with the operations of determination block 206 of the method 200 as described.

Figure 4:
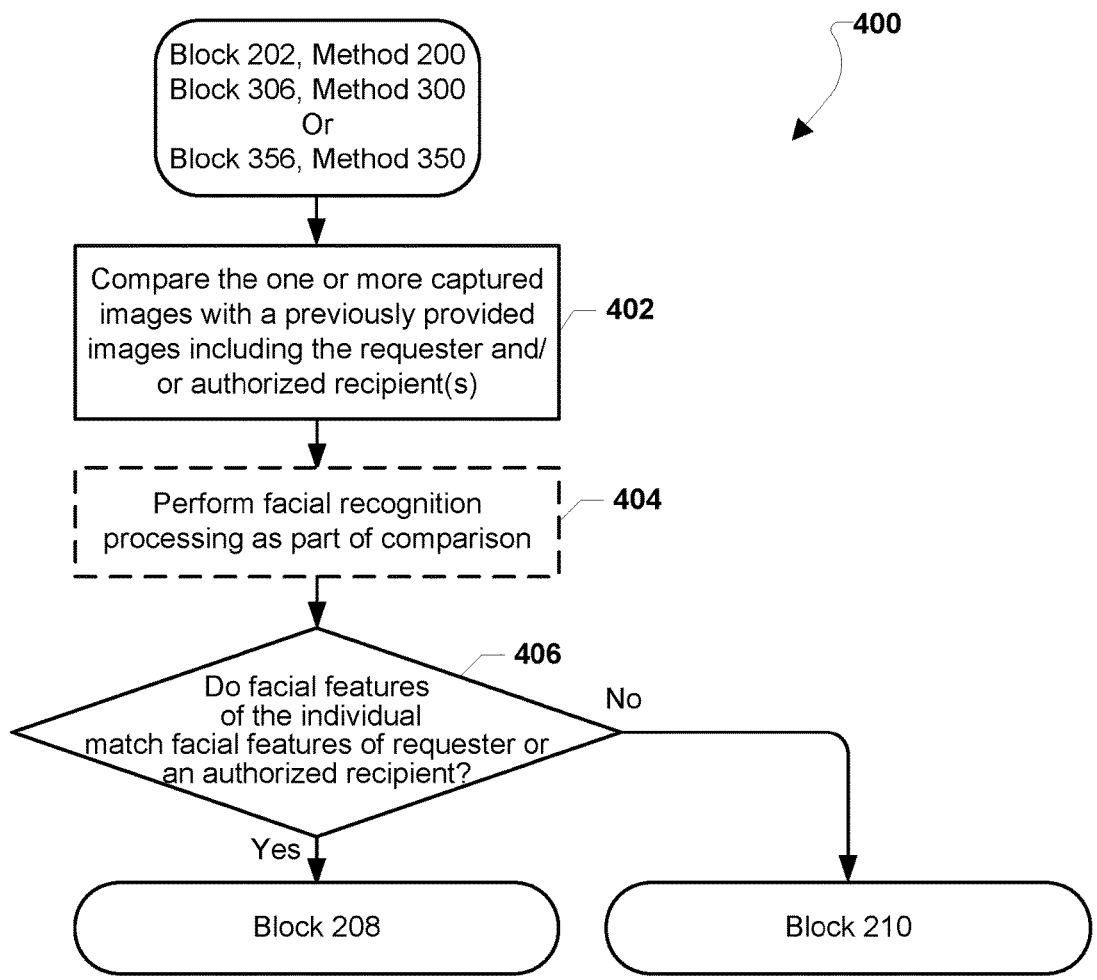
FIG. 4 is a process flow diagram illustrating a method for determining whether an individual at a package delivery location is a requester or authorized recipient of a package to be delivered by a robotic vehicle, such as a UAV, according to various embodiments.

FIG. 4 illustrates a method 400 for determining whether the individual is a requester or authorized recipient of the package to be delivered by the robotic vehicle according to various embodiments. With reference to FIGS. 1-4, the method 400 provides an example the operations that may be performed in determination block 206 of the method 200. The operations of the method 400 may be performed by one or more processors (e.g., the processor 120) of the robotic vehicle (e.g., 100).

After detecting an individual at the package delivery location in block 204 of the method 200, block 306 of the method 300, or block 356 of the method 350, the processor(s) may compare one or more images of the individual within images captured at the package delivery location with previously provided images of the requester and/or authorized recipients in block 402. In some embodiments, images of the requester and/or authorized recipients may be previously provided by the requester when the request for the package delivery is submitted (e.g., by the requester uploading the image(s) to a server when placing an order). In some embodiments, the images of the requester and/or authorized recipients may be previously obtained by a robotic vehicle during a previous package delivery. For example, after a robotic vehicle performing the method 200 delivers the package to an authorized recipient, the robotic vehicle may store or otherwise retain one or more images of the authorized recipient for reference during subsequent package deliveries. In some embodiments, the images of the requester and/or authorized recipients maybe uploaded to the robotic vehicle's memory by a server as part of delivery mission planning information.

In optional block 404, facial recognition processing may be performed as part of the image comparison in block 402. In some embodiments, the processor(s) may perform facial recognition processing on the one or more captured images to identify facial features of the individual at the package delivery location that can be compared to facial features of the requester and/or authorized recipients in the previously provided images. In some embodiments, such facial recognition processing on the one or more captured images may be performed by a server, with the identified facial features provided to the robotic vehicle. In some embodiments, facial recognition processing of the requester and/or authorized recipients may be performed at approximately the same time as facial recognition processing of the one or more images captured at the package delivery location. In some embodiments, facial recognition processing of the previously provided images of the requester and/or authorized recipients may be performed before the package delivery mission begins with the facial features obtained by this analysis stored in memory of the robotic vehicle. For example, facial recognition processing of the previously provided images of the requester and/or authorized recipients may be performed by the processor(s) of the robotic vehicle (e.g., prior to arrival at the package delivery location), by a processor(s) of another robotic vehicle (e.g., as part of a previous package delivery), or by a server.

In determination block 406, a determination may be made regarding whether facial features of the individual at the package delivery location match facial features of the requester or authorized recipient within a threshold value or level of similarity. In some embodiments, this determination may be performed by the processor(s) of the robotic vehicle. In some embodiments, this determination may be performed by a server in communication with the robotic vehicle. For example, the processor(s) may send the one or more captured images to a server and receive an indication as to whether a depiction contained within the one or more captured images matches a depiction of the requester or authorized recipient. In some embodiments, a threshold value or level of similarity may be used to determine that the imaged individual is the requester or authorized recipient if the threshold is exceeded. In some embodiments, the match threshold may be set and/or adjusted by the requester. Alternatively or in addition, the match threshold may be set automatically or in an otherwise automated fashion, such as via machine learning or artificial intelligence. Using a threshold value or level of similarity for determining whether an imaged individual is the same as the requester or an authorized recipient may accommodate the inevitable variability in facial features extracted from different images of the same person taken on different days at different angles and in different lighting conditions.

In some embodiments, the previously provided images of the requester and/or authorized recipient(s) may include an indication of a period or duration of validity of the images. For example, a recipient may provide one or more images and specify a duration, time limit or timeframe in which the images may be used to verify individuals at a package delivery location. Such time limits may be used by requesters to enable one-time pickups by certain individuals, avoid perpetual authorizations of employees who could leave or be fired, etc. In such embodiments, the decisions made in determination block 406 may include determining whether a validity duration for the previously provided image has expired.

In response to determining that the facial features of the individual at the package delivery location matches facial features of the requester or authorized recipient (i.e., determination block 406="Yes"), the processor(s) may determine that the individual is the requester or an authorized recipient and deliver the package in block 208 of method 200 as described. In embodiments in which time limits are associated with previously provided images, the processor(s) may deliver the package in block 208 only if the validity duration for the previously provided image has not expired.

In response to determining that the facial features of the individual at the package delivery location do not match the facial features of the requester or authorized recipient (i.e., determination block 406="No"), the processor(s) may send a notification to the requester in block 210 of method 200 as described. In embodiments in which time limits are associated with previously provided images, the processor(s) may send a notification to the requester in block 210 of method 200 if the validity duration for the previously provided image has expired even if there is a match within the threshold value or level of similarity.

Figure 5A:
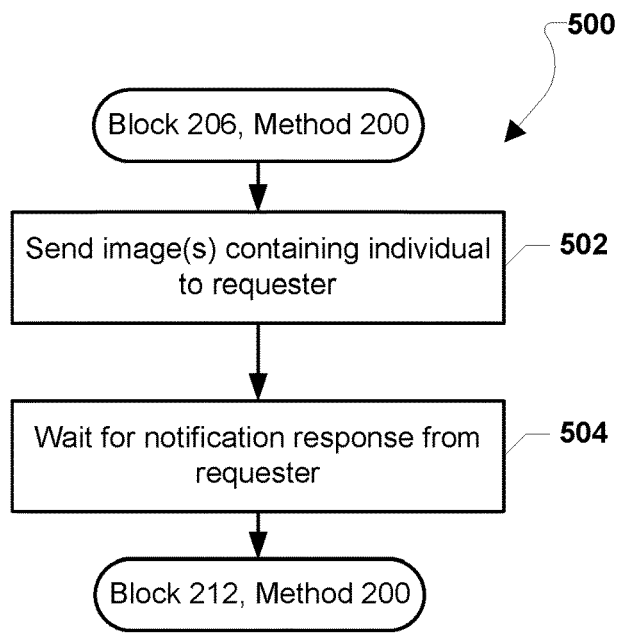
FIG. 5A is a process flow diagram illustrating a method for sending a notification to a requester of a package to be delivered by a robotic vehicle, such as a UAV, at a package delivery location according to various embodiments.
Figure 5B:
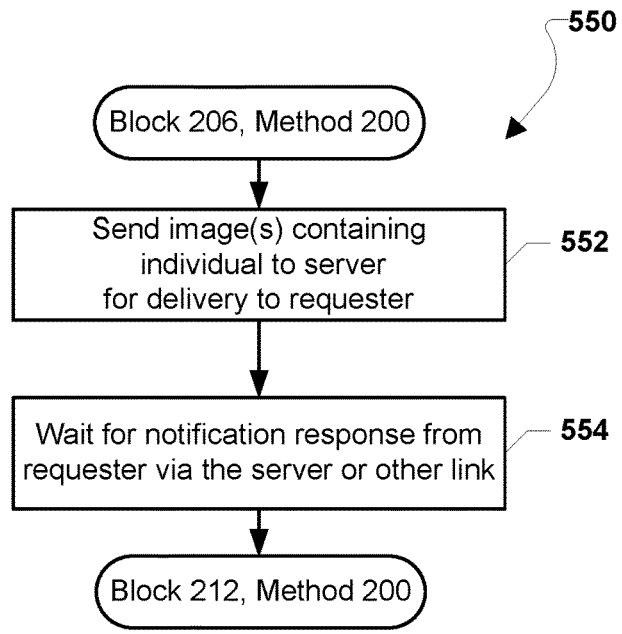
FIG. 5B is a process flow diagram illustrating an alternate method for sending a notification to a requester of a package to be delivered by a robotic vehicle, such as a UAV, at a package delivery location according to various embodiments.

FIGS. 5A and 5B illustrate methods 500 and 550 for sending notifications to a requester. With reference to FIGS. 1-5B, the methods 500 and 550 provide examples of operations that may be performed in block 210 of the method 200. The operations of the methods 500 and 550 may be performed by one or more processors (e.g., the processor 120) of a robotic vehicle (e.g., 100). The method 500 is for sending a notification to a requester directly from the robotic vehicle. The method 550 is for sending a notification to a requester by way of a server.

Referring to the method 500, in response to determining that no individual at the package delivery location matches the requester or predetermined authorized recipient in determination block 206, the processor(s) may send a notification to the requester that includes at least one of the one or more captured images to the requester in block 502. In some embodiments, the notification may be sent to a mobile device of the requester, such as in a format suitable for reception and use by an application running on the requester's smartphone. In some embodiments, the requester may identify or otherwise define the mobile device during the process of requesting delivery of the package by robotic vehicle (e.g., purchasing a product via a server). In some embodiments, the notification may be sent as an e-mail containing the at least one of the one or more captured images. In some embodiments, the notification may be sent as a text, SMS, MMS or similar type message containing the at least one of the one or more captured images. In some embodiments, the notification may be sent using a smartphone or tablet app that uses Wi-Fi or cellular data to send a message containing at least one of the one or more captured images. In some embodiments, the notification may include a universal resource location (URL) linking to a server where the at least one of the one or more images may be hosted or otherwise stored on a server and the notification is sent as either an e-mail or text/SMS. In block 504, the processor(s) may wait for a notification response from the requester, and determine whether a response is received in determination block 212 of the method 200 as described.

Referring to the method 550, in response to determining that no individual at the package delivery location matches the requester or predetermined authorized recipient in determination block 206, the processor(s) may send the at least one of the one or more captured images to a server in block 552, and the server may send a notification to the requester. For example, the server may send the notification to a mobile device of the requester. As described above, the notification may contain the at least one of the one or more captured images. In some embodiments, the server may send the notification via e-mail, text/SMS/MMS, or some other communication link. In some embodiments, the notification may contain a URL linking to a file location (e.g., on the server) storing or hosting the at least one of the one or more captured images. In some embodiments, the URL contained in the notification may link to a different server, in which case the server sending the notification may also send the at least one of the one or more captured images to the different server. In block 554, the processor(s) may wait for a notification response from the requester, which may be received via the server or a different communication link. The processor may determine whether a response is received in determination block 212 of the method 200 as described.

Figure 6:
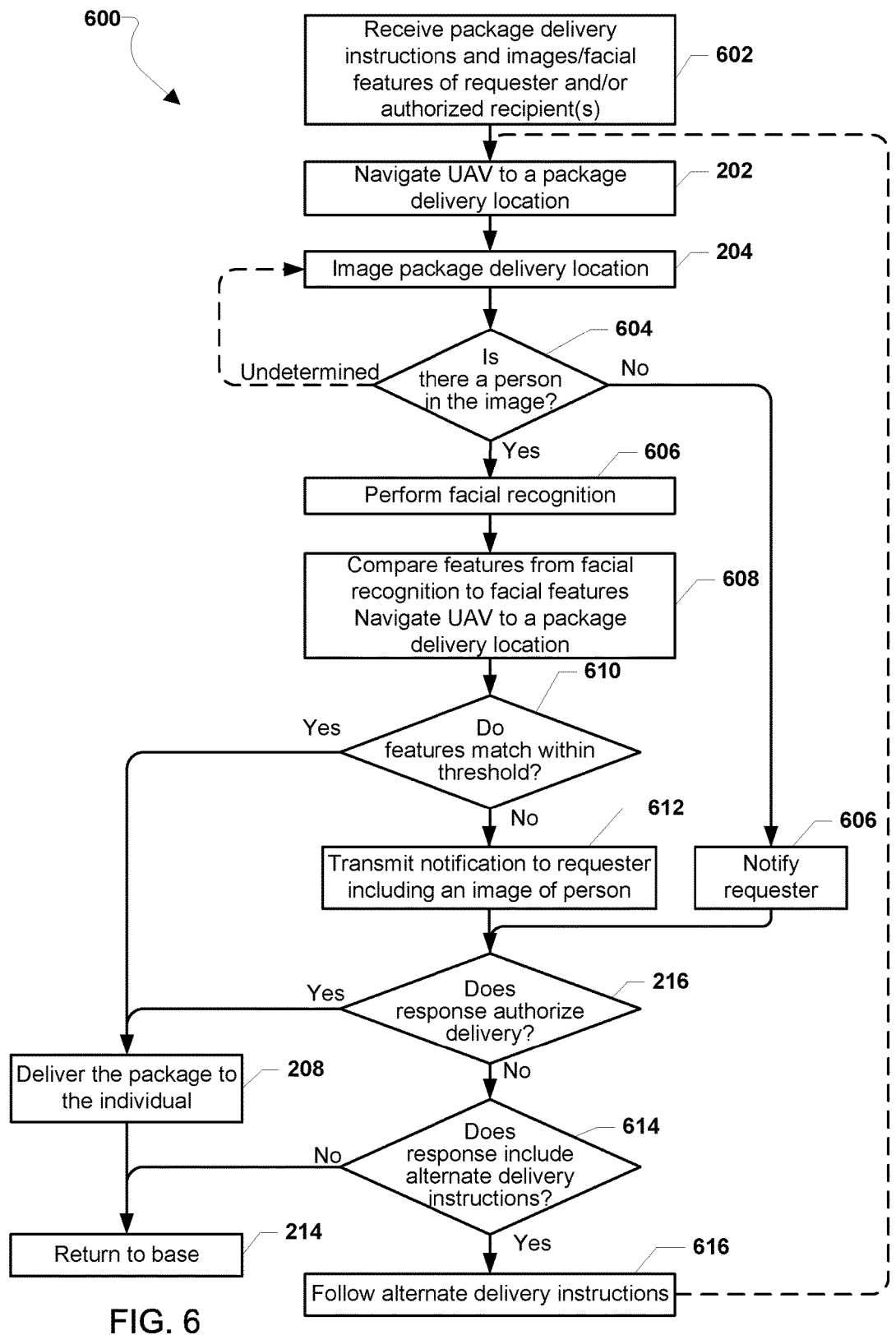
FIG. 6 is a process flow diagram illustrating a method for performing package delivery by a robotic vehicle, such as a UAV, according to some embodiments

FIG. 6 illustrates a method 600 for performing package delivery by a delivery robotic vehicle according to some embodiments. With reference to FIGS. 1-6, the operations of the method 600 may be performed by one or more processors (e.g., the processor 120) of a robotic vehicle (e.g., 100). The robotic vehicle may have sensors (e.g., 140), cameras (e.g., 127), and communication resources (e.g., 130) that may be used for detecting and identifying individuals, and the processor(s) may be configured with image processing algorithms, including facial recognition algorithms, for determining whether an individual at a package delivery location is a requester or authorized recipient of a package or product to be delivered.

In block 602, the processor(s) at a base, depot, or other location may receive package delivery instructions indicating the package delivery location. In some embodiments, package delivery instructions may include images or facial features of the requester and/or authorized recipient(s). In some embodiments, the package delivery instructions may include digital images of the requester and/or authorized recipient(s) that the processor(s) can use for performing facial recognition processes. In some embodiments, the package delivery instructions may include facial features of the requester and/or authorized recipient(s) that were previously obtained using facial recognition algorithms (e.g., by a server), rather than complete digital images. Such delivery instructions may be received from a server or local computer at the base or depot via wired or wireless data links. Such package delivery instructions may include other information, such as flight plans or routes, weather information, etc. In some embodiments, the processor(s) may receive digital images or facial features of the requester and/or authorized recipient(s) after the robotic vehicle has already navigated away from a base, depot, or other location (e.g., as part of block 202).

In block 202, the robotic vehicle may navigate to the package delivery location.

In block 204, the processor(s) may activate a camera or cameras upon arriving at the package delivery location and obtain images of the location to include images of any individuals awaiting the package delivery.

In determination block 604, the processor(s) may perform image processing on the obtained image(s) to determine whether there is a person present. Such processing may involve shape recognition algorithms and/or face recognition algorithms configured to recognize people within digital images.

In some embodiments, the processor(s) may determine whether the obtained image(s) have sufficient resolution or perspective to enable recognition of human forms, and if not (i.e., determination block 604="Undetermined"), the processor(s) may activate the camera or cameras to take further images at the package delivery location in block 204. Thus, if the processor(s) is unable to determine whether human forms appear in the obtained images because the images are of insufficient quality, taken from too far away, too dark, etc., the processor(s) continue to obtain further images until a determination can be made regarding whether a person is present at the package delivery location.

In response to determining that no one is present in images captured at the delivery location (i.e., determination block 604="No"), the processor(s) may notify the requester by sending a message indicating that no person is present to receive the package. Such a message may be transmitted by email, text/SMS/MMS messaging, or other communication methods.

In response to determining that there is at least one person present in the images captured at the delivery location (i.e., determination block 604="Yes"), the processor(s) may perform facial recognition processing of the image(s) captured at the package delivery location to extract facial features of the persons present in the image(s) in block 600. Such facial recognition processing may extract facial features of the people within the images. In some embodiments, the robotic vehicle may maneuver closer to an individual present at the package delivery location and obtain a close-up image of that person's face in order to obtain a clearer or larger image for facial recognition processing and providing to the requester in the event that the individual is not recognized by the robotic vehicle.

In block 608, the processor(s) may compare the facial features obtained by performing facial recognition processing on the image(s) captured at the package delivery location to facial features of the requester and/or authorized recipient(s). Such comparisons may use any of a variety of facial recognition and comparison algorithms that have been developed for other purposes. For example, any facial features that the processor(s) was able to extract from the image(s) captured at the package delivery location may be compared to the same type of facial features extracted from previously received images of the requester and/or authorized recipient(s).

In determination block 610, the processor(s) may determine based on the comparison performed in block 608 whether the facial features obtained from the image(s) captured at the package delivery location match facial features of the requester and/or any authorized recipient(s) within a threshold value or level of similarity. It is unlikely that a perfect match of facial features will be achieved between images obtained by the robotic vehicle and previously provided images of the requester and/or authorized recipient(s). Thus, a determination of whether any of the requester or authorized recipient(s) is present at the package delivery location based on facial recognition methods may depend upon the degree to which obtain facial features are matched, which may be tested against a threshold value or level representing a degree of similarity. Such a threshold value or level may be predetermined or set by the requester (e.g., during the package request process). In some embodiments, the threshold value or level may be learned over time by the robotic vehicle or a server based upon requester responses to notifications during package delivery operations.

In some embodiments, the previously provided images of the requester and/or authorized recipient(s) may include an indication of a period or duration of validity of the images. For example, a recipient may provide one or more images and specify a duration, time limit or timeframe in which the images may be used to verify individuals at a package delivery location. Such time limits may be used by requesters to enable one-time pickups by certain individuals, avoid perpetual authorizations of employees who could leave or be fired, etc. In such embodiments, the decisions made in determination block 610 may include determining whether a validity duration for the previously provided image has expired.

In response to determining that the facial features obtained from the image(s) captured at the package delivery location match facial features of the requester and/or any authorized recipient(s) within the threshold value or level of similarity i.e., determination block 604="Yes"), the processor(s) may deliver the package to the individual(s) at the package delivery location in block 208, and return to base in block 214. In embodiments in which time limits are associated with previously provided images, the processor(s) may deliver the package in block 208 only if the validity duration for the previously provided image has not expired.

In response to determining that the facial features obtained from the image(s) captured at the package delivery location do not match facial features of the requester and/or any authorized recipient(s) within the threshold value or level of similarity i.e., determination block 610="No"), the processor(s) may transmit a notification to the requester including an image of the person or persons at the package delivery location in block 612. In doing so, the processor(s) may crop one or more images captured at the package delivery location to include primarily the face or faces of the person or persons at the package delivery location, and include the cropped image in the notification transmitted to the requester. In embodiments in which time limits are associated with previously provided images, the processor(s) may send the notification to the requester in block 612 if the validity duration for the previously provided image has expired even if there is a match within the threshold value or level of similarity. As described, the notification to the requester may be transmitted using any of a number of communication methods, including email, text/SMS/MMS messaging, dedicated application communication links, etc. As part of the operations in block 612, the robotic vehicle may await a predetermined amount of time to receive a response from the requester.

After transmission of notifications to the requester in either of blocks 606 or 612, the processor(s) may determine whether a received notification response authorizes package delivery in determination block 216.

In response to determining that the notification response authorizes delivery (i.e., determination block 216="Yes"), the processor(s) may control the robotic vehicle to deliver the package in block 208, and then return to base in block 214.

In response to determining that the notification response does not authorize delivery (i.e., determination block 216="No"), the processor(s) may determine whether the notification response includes alternate delivery instructions for delivering the product in determination block 616. Some nonlimiting examples of alternate delivery instructions that the requester may provide include providing an alternate delivery location, identifying another authorized recipient, directing the robotic vehicle to return to the original package delivery location at a later specified time, directing the robotic vehicle to deliver the package to a supervised pickup location, directing the robotic vehicle to deliver the package at a particular secure location, returning the package or product to the originator, and declining delivery of the package. Thus, the method 600 enables the requester to redirect the package delivery in a flexible manner, and thus reduce the chance that a robotic vehicle package delivery mission will be unsuccessful.

In situations in which the requester's alternate delivery instructions include delivering the package to the requester or an authorized recipient at an alternate delivery location, the processor(s) may direct the robotic vehicle to navigate to the alternate delivery location in block 202 and perform operations of the method 600 at the alternate delivery location as described.

In the event that no responses received from the requester in response to either of blocks 606 or 612, the robotic vehicle may return the package to base in block 214 consistent with not receiving an authorization to complete the delivery in determination block 216 and not receiving alternate delivery instructions in determination block 614.

Figure 7:
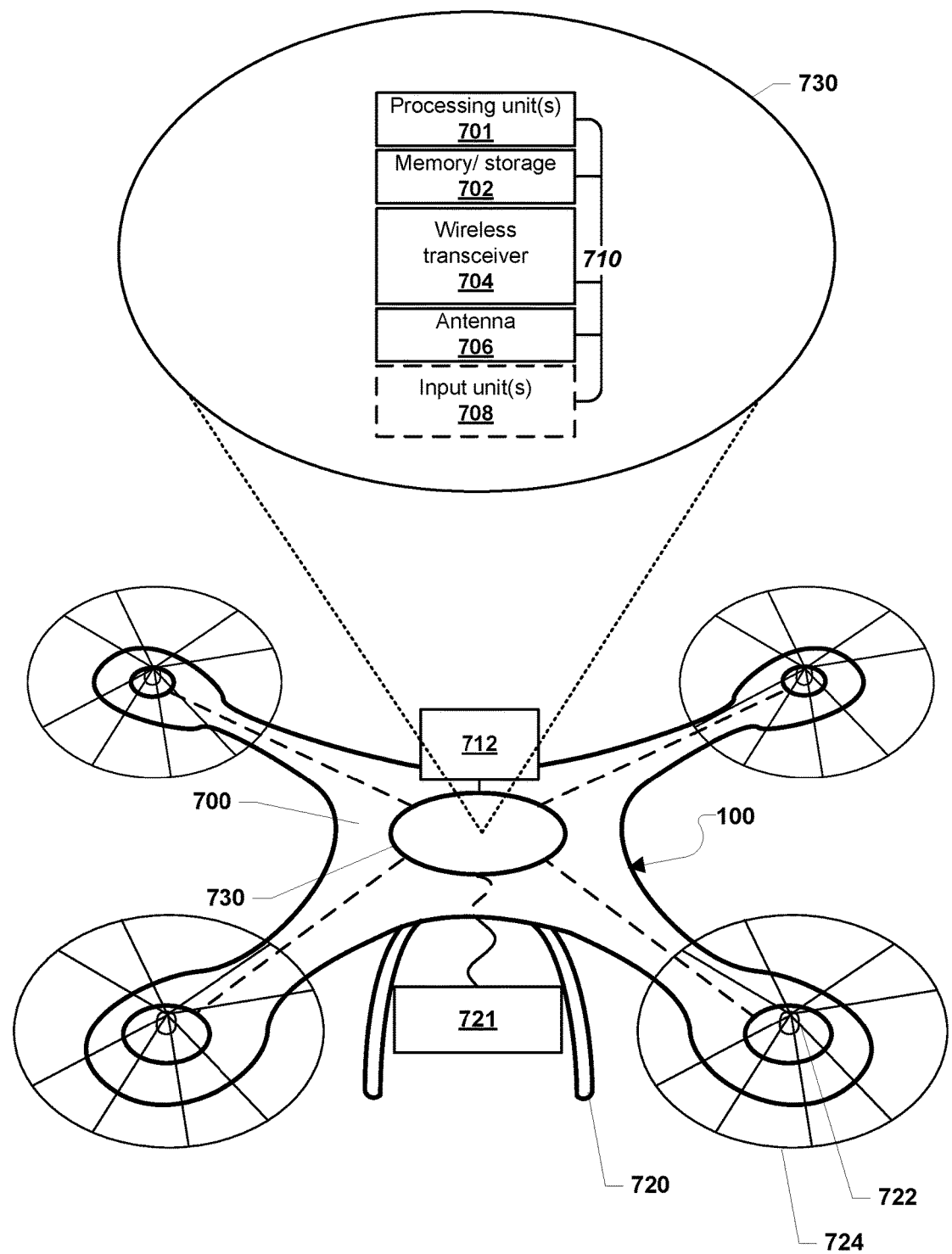
FIG. 7 is a component block diagram of a robotic vehicle, such as an aerial UAV, suitable for use with various embodiments.

Various embodiments may be implemented within a variety of robotic vehicles, an example of which in the form of a four-rotor UAV is illustrated in FIG. 7 that is suitable for use with various embodiments. With reference to FIGS. 1-7, the robotic vehicle 100 may include a body 700 (i.e., fuselage, frame, etc.) that may be made out of any combination of plastic, metal, or other materials suitable for flight. The body 700 may include a processor 730 that is configured to monitor and control the various functionalities, subsystems, and/or other components of the robotic vehicle 100. For example, the processor 730 may be configured to monitor and control various functionalities of the robotic vehicle 100, such as any combination of modules, software, instructions, circuitry, hardware, etc. related to propulsion, navigation, power management, sensor management, and/or stability management.

The processor 730 may include one or more processing unit(s) 701, such as one or more processors configured to execute processor-executable instructions (e.g., applications, routines, scripts, instruction sets, etc.), a memory and/or storage unit 702 configured to store data (e.g., flight plans, obtained sensor data, received messages, applications, etc.), and a wireless transceiver 704 and antenna 706 for transmitting and receiving wireless signals (e.g., a Wi-Fi® radio and antenna, Bluetooth®, RF, etc.). In some embodiments, the robotic vehicle 100 may also include components for communicating via various wide area networks, such as cellular network transceivers or chips and associated antenna (not shown). In some embodiments, the processor 730 of the robotic vehicle 100 may further include various input units 708 for receiving data from human operators and/or for collecting data indicating various conditions relevant to the robotic vehicle 100. For example, the input units 708 may include camera(s), microphone(s), location information functionalities (e.g., a global positioning system (GPS) receiver for receiving GPS coordinates), flight instruments (e.g., attitude indicator(s), gyroscope(s), accelerometer(s), altimeter(s), compass(es), etc.), keypad(s), etc. The various components of the processor 730 may be connected via a bus 710 or another similar circuitry.

The body 700 may include landing gear 720 of various designs and purposes, such as legs, skis, wheels, pontoons, etc. The body 700 may also include a payload mechanism 721 configured to hold, hook, grasp, envelope, and otherwise carry various payloads, such as boxes. In some embodiments, the payload mechanism 721 may include and/or be coupled to actuators, tracks, rails, ballasts, motors, and other components for adjusting the position and/or orientation of the payloads being carried by the robotic vehicle 100. For example, the payload mechanism 721 may include a box moveably attached to a rail such that payloads within the box may be moved back and forth along the rail. The payload mechanism 721 may be coupled to the processor 730 and thus may be configured to receive configuration or adjustment instructions. For example, the payload mechanism 721 may be configured to engage a motor to re-position a payload based on instructions received from the processor 730.

The robotic vehicle 100 may be of a helicopter design that utilizes one or more rotors 724 driven by corresponding motors 722 to provide lift-off (or take-off) as well as other aerial movements (e.g., forward progression, ascension, descending, lateral movements, tilting, rotating, etc.). The robotic vehicle 100 may utilize various motors 722 and corresponding rotors 724 for lifting off and providing aerial propulsion. For example, the robotic vehicle 100 may be a "quad-copter" that is equipped with four motors 722 and corresponding rotors 724. The motors 722 may be coupled to the processor 730 and thus may be configured to receive operating instructions or signals from the processor 730. For example, the motors 722 may be configured to increase rotation speed of their corresponding rotors 724, etc. based on instructions received from the processor 730. In some embodiments, the motors 722 may be independently controlled by the processor 730 such that some rotors 724 may be engaged at different speeds, using different amounts of power, and/or providing different levels of output for moving the robotic vehicle 100. For example, motors 722 on one side of the body 700 may be configured to cause their corresponding rotors 724 to spin at higher rotations per minute (RPM) than rotors 724 on the opposite side of the body 700 in order to balance the robotic vehicle 100 burdened with an off-centered payload.

The body 700 may include a power source 712 that may be coupled to and configured to power the various other components of the robotic vehicle 100. For example, the power source 712 may be a rechargeable battery for providing power to operate the motors 722, the payload mechanism 721, and/or the units of the processor 730.

Figure 8:
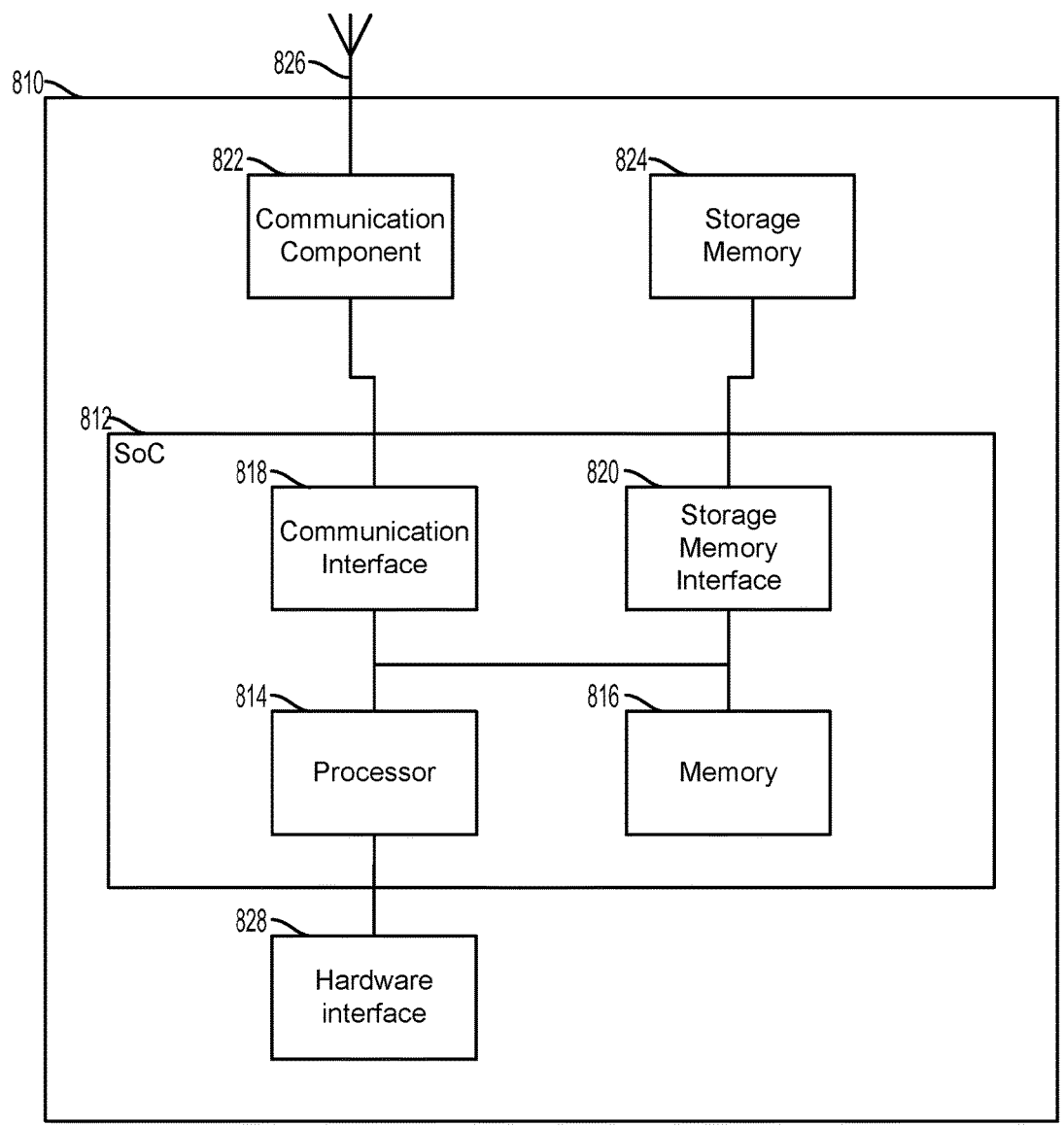
FIG. 8 is a component block diagram illustrating a processing device suitable for implementing various embodiments.

FIG. 8 is a component block diagram illustrating a processing device suitable for implementing various embodiments.

Various embodiments may be implemented within a processing device 810 configured to be used in a robotic vehicle. A processing device may be configured as or including a system-on-chip (SoC) 812, an example of which is illustrated FIG. 8. With reference to FIGS. 1-8, the SOC 812 may include (but is not limited to) a processor 814, a memory 816, a communication interface 818, and a storage memory interface 820. The processing device 810 or the SOC 812 may further include a communication component 822, such as a wired or wireless modem, a storage memory 824, an antenna 826 for establishing a wireless communication link, and/or the like. The processing device 810 or the SOC 812 may further include a hardware interface 828 configured to enable the processor 814 to communicate with and control various components of a robotic vehicle. The processor 814 may include any of a variety of processing devices, for example any number of processor cores.

The term "system-on-chip" (SoC) is used herein to refer to a set of interconnected electronic circuits typically, but not exclusively, including one or more processors (e.g., 814), a memory (e.g., 816), and a communication interface (e.g., 818). The SOC 812 may include a variety of different types of processors 814 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 812 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 812 may include one or more processors 814. The processing device 810 may include more than one SoC 812, thereby increasing the number of processors 814 and processor cores. The processing device 810 may also include processors 814 that are not associated with an SoC 812 (i.e., external to the SoC 812). Individual processors 814 may be multicore processors. The processors 814 may each be configured for specific purposes that may be the same as or different from other processors 814 of the processing device 810 or SOC 812. One or more of the processors 814 and processor cores of the same or different configurations may be grouped together. A group of processors 814 or processor cores may be referred to as a multi-processor cluster.

The memory 816 of the SoC 812 may be a volatile or non-volatile memory configured for storing data and processor-executable instructions for access by the processor 814. The processing device 810 and/or SoC 812 may include one or more memories 816 configured for various purposes. One or more memories 816 may include volatile memories such as random access memory (RAM) or main memory, or cache memory.

Some or all of the components of the processing device 810 and the SOC 812 may be arranged differently and/or combined while still serving the functions of the various aspects. The processing device 810 and the SOC 812 may not be limited to one of each of the components, and multiple instances of each component may be included in various configurations of the processing device 810.

The various processors described herein may be any programmable microprocessor, microcomputer or multiple processor chip or chips that can be configured by software instructions (applications) to perform a variety of functions, including the functions of various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, any block(s) of the method 600 may be incorporated into any one of the methods 200/300/400/500 and vice versa.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described generally in terms of functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable software, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read only memory (ROM), electrically erasable programmable ROM (EEPROM), FLASH memory, compact disc ROM (CD-ROM) or other optical disk storage, magnetic disk storage or other magnetic storage smart objects, or any other medium that may be used to store desired program code in the form of instructions or data structures and that may be accessed by a computer. Disk and disc, as used herein, includes CD, laser disc, optical disc, digital versatile disc (DVD), floppy disk, and Blu-ray disc where disks usually reproduce data magnetically, while discs reproduce data optically with lasers. Combinations of memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the claims are not intended to be limited to the embodiments shown herein but are to be accorded the widest scope consistent with the language of the claims and the principles and novel features disclosed herein.

What is claimed is:

1. A method of performing a package delivery by a robotic vehicle, comprising:
   capturing, by a camera of the robotic vehicle, an image of an individual at a package delivery location;
   determining whether the individual at the package delivery location is a requester or a predetermined authorized recipient of a package to be delivered by the robotic vehicle at the package delivery location;
   sending a notification from the robotic vehicle to the requester of the package in response to determining that the individual at the package delivery location is not the requester or the predetermined authorized recipient, the notification including the image captured at the package delivery location;
   receiving an authorization at the robotic vehicle from the requester authorizing the individual at the package delivery location;
   saving to a memory at the robotic vehicle, in response to receiving the authorization, the image captured at the package delivery location to indicate that the individual at the package delivery location is a predetermined authorized recipient for subsequent package deliveries; and
   delivering the package to the individual at the package delivery location in response to receiving authorization from the requester to deliver the package to the individual.

2. The method of claim 1, wherein:
   determining whether the individual at the package delivery location is the requester or the predetermined authorized recipient of the package comprises:
      determining whether any individual in the image captured at the package delivery location matches a previously provided image of the requester or the predetermined authorized recipient.

3. The method of claim 2, wherein determining whether any individual in the image captured at the package delivery location matches a previously provided image of the requester or the predetermined authorized recipient comprises performing facial recognition processing of the image captured at the package delivery location.

4. The method of claim 2, wherein determining whether any individual in the image captured at the package delivery location matches a previously provided image of the requester or the predetermined authorized recipient comprises:
   sending the image captured at the package delivery location to a server; and
   receiving, by the robotic vehicle and from the server, results of image processing performed by the server on the image captured at the package delivery location.

5. The method of claim 2, wherein determining whether any individual in the image captured at the package delivery location matches a previously provided image of the requester or the predetermined authorized recipient comprises:
   performing facial recognition processing on the image captured at the package delivery location to obtain facial features of the individual at the package delivery location; and
   determining whether the obtained facial features match facial features obtained from the previously provided image of the requester or the predetermined authorized recipient within a threshold value of similarity.

6. The method of claim 2, wherein determining whether any individual in the image captured at the package delivery location matches a previously provided image of the requester or the predetermined authorized recipient comprises performing, by a processor of the robotic vehicle, facial recognition processing on the image captured at the package delivery location by the robotic vehicle.

7. The method of claim 2, wherein the previously provided image of the requester or the predetermined authorized recipient was provided by the requester before the package delivery.

8. The method of claim 7, further comprising delivering the package to the individual in response to determining that the individual at the package delivery location is either the requester or the predetermined authorized recipient.

9. The method of claim 8, wherein delivering the package to the individual in response to determining that the individual at the package delivery location is either the requester or the predetermined authorized recipient further comprises:
   determining that a validity duration for the previously provided image has not expired; and
   determining that a location associated with the previously provided image matches the package delivery location.

10. The method of claim 2, wherein the previously provided image of the requester or the predetermined authorized recipient was previously captured by the robotic vehicle while performing a previous package delivery.

11. The method of claim 1, further comprising:
    receiving, by the robotic vehicle from the requester, an alternate package delivery location in response to the notification; and
    proceeding to the alternate package delivery location to attempt the package delivery.

12. The method of claim 1, further comprising:
proceeding to a determined location in response to receiving, by the robotic vehicle and from the requester, an indication that the package should not be delivered to the individual.

13. The method of claim 1, further comprising:
proceeding to a determined location in response to not receiving a response from the requester to the notification within a predetermined amount of time.

14. A robotic vehicle, comprising:
a camera;
a processor configured with processor-executable instructions to:
  capture, by the camera, an image at a package delivery location for a package delivery including an individual at the package delivery location;
  determine whether the individual at the package delivery location is a requester or a predetermined authorized recipient of a package to be delivered by the robotic vehicle at the package delivery location;
  send a notification from the robotic vehicle to the requester of the package in response to determining that the individual at the package delivery location is not the requester or the predetermined authorized recipient, the notification including the image captured at the package delivery location;
  receiving an authorization at the robotic vehicle from the requester authorizing the individual at the package delivery location;
  saving to a memory at the robotic vehicle, in response to receiving the authorization, the image captured at the package delivery location to indicate that the individual at the package delivery location is a predetermined authorized recipient for subsequent package deliveries; and
  deliver the package to the individual at the package delivery location in response to receiving authorization from the requester to deliver the package to the individual.

15. The robotic vehicle of claim 14, wherein:
the processor is further configured with processor-executable instructions to determine whether the individual at the package delivery location is the requester or the predetermined authorized recipient of a package by:
  determining whether any individual in the image captured at the package delivery location matches a previously provided image of the requester or the predetermined authorized recipient.

16. The robotic vehicle of claim 15, wherein the processor is further configured with processor-executable instructions to determine whether any individual in the image captured at the package delivery location matches a previously provided image of the requester or the predetermined authorized recipient by performing facial recognition processing of the image captured at the package delivery location.

17. The robotic vehicle of claim 15, wherein the processor is further configured with processor-executable instructions to determine whether any individual in the image captured at the package delivery location matches a previously provided image of the requester or the predetermined authorized recipient by:
  sending the image captured at the package delivery location to a server; and
  receiving, from the server, results of image processing performed by the server on the image captured at the package delivery location.

18. The robotic vehicle of claim 15, wherein the processor is further configured with processor-executable instructions to determine whether any individual in the image captured at the package delivery location matches a previously provided image of the requester or the predetermined authorized recipient by:
  performing facial recognition processing on the image captured at the package delivery location to obtain facial features of an individual; and
  determining whether the obtained facial features match facial features obtained from the previously provided image of the requester or the predetermined authorized recipient within a threshold value of similarity.

19. The robotic vehicle of claim 15, wherein the processor is further configured with processor-executable instructions to determine whether any individual in the image captured at the package delivery location matches a previously provided image of the requester or the predetermined authorized recipient by performing facial recognition processing on the image captured at the package delivery location.

20. The robotic vehicle of claim 15, wherein the processor is further configured with processor-executable instructions to deliver the package to the individual in response to determining that the individual at the package delivery location is either the requester or the predetermined authorized recipient.

21. The robotic vehicle of claim 14, wherein the processor is further configured with processor-executable instructions to:
  receive, from the requester, an alternate package delivery location in response to the notification; and
  proceed to the alternate package delivery location to attempt the delivery of the package.

22. The robotic vehicle of claim 14, wherein the processor is further configured with processor-executable instructions to:
  proceed to a determined location in response to receiving, from the requester, an indication that the package should not be delivered to the individual.

23. The robotic vehicle of claim 14, wherein the processor is further configured with processor-executable instructions to:
  proceed to a determined location in response to not receiving a response from the requester to the notification within a pre-determined amount of time.

24. A robotic vehicle, comprising:
means for capturing, by a camera of the robotic vehicle, an image at a package delivery location for a package delivery including an individual at the package delivery location;
means for determining whether the individual at the package delivery location is a requester or a predetermined authorized recipient of a package to be delivered by the robotic vehicle at the package delivery location;
means for sending a notification from the robotic vehicle to the requester of the package in response to determining that the individual at the package delivery location is not the requester or the predetermined authorized recipient, the notification including the image captured at the package delivery location;
means for receiving an authorization at the robotic vehicle from the requester authorizing the individual at the package delivery location;
means for saving to a memory at the robotic vehicle, in response to receiving the authorization, the image captured at the package delivery location to indicate that the individual at the package delivery location is a predetermined authorized recipient for subsequent package deliveries; and means for delivering the package to the individual at the package delivery location in response to receiving authorization from the requester to deliver the package to the individual.

25. A processing device configured to:

capture, by a camera of a robotic vehicle, an image at a package delivery location for a package delivery including an individual at the package delivery location;

determine whether the individual at the package delivery location is a requester or a predetermined authorized recipient of a package to be delivered by the robotic vehicle at the package delivery location;

send a notification to the requester of the package in response to determining that the individual at the package delivery location is not the requester or the predetermined authorized recipient, the notification including the image captured at the package delivery location;

receive an authorization from the requester authorizing the individual at the package delivery location;

save to memory, in response to receiving the authorization, the image captured at the package delivery location to indicate that the individual at the package delivery location is a predetermined authorized recipient for subsequent package deliveries; and deliver the package to the individual at the package delivery location in response to receiving authorization from the requester to deliver the package to the individual.

26. The processing device of claim 25, further configured to:

determine whether the individual at the package delivery location is the requester or the predetermined authorized recipient of a package by:

determine whether any individual in the image captured at the package delivery location matches a previously provided image of the requester or the predetermined authorized recipient.

27. The processing device of claim 26, further configured to determine whether any individual in the image captured at the package delivery location matches a previously provided image of the requester or the predetermined authorized recipient by performing facial recognition processing of the image captured at the package delivery location.

28. The processing device of claim 27, wherein the previously provided image of the requester or the predetermined authorized recipient was provided by the requester before the package delivery, and wherein the processing device is further configured to deliver the package to the individual in response to:

determining that the individual at the package delivery location is either the requester or an authorized recipient; and determining that a validity duration for the previously provided image has not expired.

29. The processing device of claim 27, wherein the previously provided image of the requester or an authorized recipient was previously captured by the robotic vehicle, and wherein the processing device is further configured to deliver the package to the individual in response to:

determining that the individual at the package delivery location is either the requester or an authorized recipient; and determining that a location associated with the previously provided image matches the package delivery location.

30. The processing device of claim 26, wherein the processing device is further configured to:

receive, by the robotic vehicle from the requester, an alternate package delivery location in response to the notification; and proceed to the alternate package delivery location to attempt the package delivery.

* * * * *